United States Patent [19]
Kirk

[11] 3,855,547
[45] Dec. 17, 1974

[54] OPTICAL CAVITY FOR A LASER
[75] Inventor: Joseph Pennell Kirk, Rockville, Md.
[73] Assignee: International Bussiness Machines Corporation, Armonk, N.Y.
[22] Filed: Nov. 29, 1973
[21] Appl. No.: 420,354

[52] U.S. Cl. .................... 331/94.5 C, 331/94.5 G
[51] Int. Cl. .............................................. H01s 3/00
[58] Field of Search .................. 331/94.5 C, 94.5 G

[56] References Cited
UNITED STATES PATENTS

| | | | |
|---|---|---|---|
| 3,388,343 | 6/1968 | White | 331/94.5 |
| 3,586,998 | 6/1971 | Gould | 331/94.5 |
| 3,670,262 | 6/1972 | Hallock et al. | 331/94.5 |
| 3,683,297 | 8/1972 | Hobart et al. | 331/94.5 |

FOREIGN PATENTS OR APPLICATIONS

| | | | |
|---|---|---|---|
| 1,128,162 | 9/1968 | Great Britain | 331/94.5 |

*Primary Examiner*—Archie R. Borchelt
*Assistant Examiner*—C. E. Church
*Attorney, Agent, or Firm*—J. Jancin, Jr.; John E. Hoel

[57] ABSTRACT

A laser is disclosed with a single, critical surface Brewster window. The Brewster window is formed by a Littrow prism having a first planar surface located along the principal optical axis of the laser and oriented at Brewster's angle with respect thereto, for admitting a refracted, plane polarized component of the laser beam. The Littrow prism has a second substantially planar face which does not require the conventional, high quality "laser polish." This second face intersects the first face along a line perpendicular to the principal axis, at an angle with respect to the first face such that the second face is substantially perpendicular to the refracted component of the laser beam. A planar mirror mounted by means of a layer of index matching optical cement, is mounted on the second face of the Littrow prism, perpendicular to the direction of propagation of the refracted, plane polarized component. This component is reflected back upon its self and out of the first planar face of the prism along the principal axis of the laser, whereby laser action is sustained. An alternate embodiment is disclosed where the laser path is folded upon itself and a 45°-90° triangular prism is employed for communicating the laser beam between the two legs of the system, via the Littrow prism. A third embodiment is disclosed of a folded path gaseous discharge laser having an improved optical efficiency and power output.

5 Claims, 4 Drawing Figures

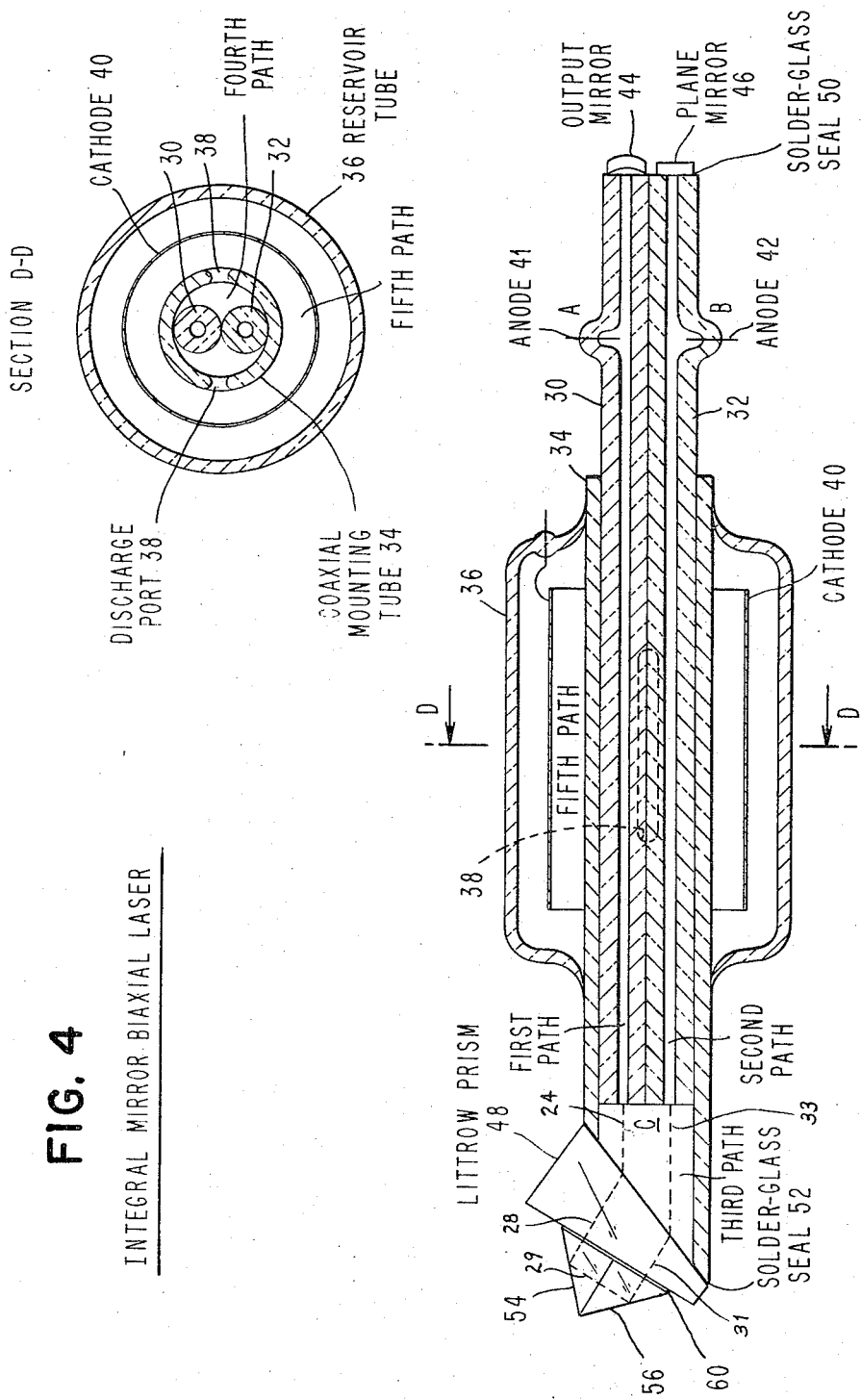

OPTICAL CAVITY FOR A LASER

FIELD OF THE INVENTION

The invention disclosed herein relates to lasers and more particularly relates to improvements in laser polarizers and gaseous discharge envelopes.

BACKGROUND OF THE INVENTION

Brewster window laser polarizers of the conventional type comprise a duo-planar optical element having optically flat parallel surfaces polished to the high industry standary known as "laser polish." The duo-parallel element is oriented at the Brewster angle such that the tangent of the angle of incidence equals the ratio of the index of refraction for the optical element divided by the index of refraction of the incident ambient. An optical surface that has been given a "laser polish"has a finer texture than the specular polish employed in the reflecting mirrors in fine reflecting telescopes, for example. The finishing of an optical surface to a "laser polish" finish is a time consuming task whose cost can only be justified if the product is manufactured in large quantities. Clearly, if the number of optical surfaces in a Brewster window could be reduced from two to one, a substantial reduction in the cost of manufacture, for comparable quantities, could be achieved.

In a gaseous discharge laser cavity formed by a planar end mirror on one end, and a concave-spherical mirror on the opposite end with its center of curvature focused upon the reflecting surface of the flat mirror. The region of the gaseous discharge which undergoes active laser action is concial in shape with the base of the cone coincident with the reflecting surface of the spherical mirror and the apex of the cone located on the surface of the flat mirror. To promote optical efficiency in the conversion of the discharge current into the laser beam output, the cross sectional diameter of the cavity should be reduced to approximately the same diameter as the active lasing region of the gaseous discharge in the cavity. This obtains because that portion of the gaseous discharge outside of the active lasing region tends to become depopulated of energy states from which light may be emitted by lasing action. The presence of this sheath of deactivated plasma into which activated plasma particles may diffuse, impedes the efficient production of a laser beam in the laser cavity. It has been the practice of the prior art to reduce the diameter of the the laser cavity to approximately the diameter of the active lasing region of the gaseous discharge. It has also been recognized in the prior art that the optical power output of a gaseous discharge laser has a maximum value for some value of gaseous discharge current density conducted through the plasma.

The prior art has taught the use of a folded path for a gaseous discharge laser such as disclosed by Hobart in U.S. Pat. No. 3,683,297. It is known that output power can be increased by increasing the length of the optical path along which stimulated emission takes place. But increasing the length of the laser makes the laser too bulky for efficient use in some applications and creates structural problems in the design and manufacture of the laser because of alignment problems. By folding the optical path of the laser into two generally parallel legs by means of reflecting elements which reflect the optical axis of the laser along two connected paths which are supported on a single frame, a higher power output can be achieved without the accompanying structural problems. However, where a flat end mirror is used on one leg and a concave-spherical mirror used on the other leg, whose center of curvature is focused by means of the reflecting elements onto the reflecting surface of the flat mirror, the above referenced problem of maintaining good optical efficiency in the production of the laser beam arrises. If one applies the prior art teaching of reducing the cross sectional area of that leg of the folded laser terminated by the planar mirror, one is immediately confronted with the alternate problem that the gaseous discharge current density in that leg of reduced cross sectional dimension will be higher than the current density in the uneffected leg. Thus, the power output for the folded laser system cannot be maximized.

OBJECTS OF THE INVENTION

It is an object of the invention to generate a polarized output from a laser having a Brewster window with only one critical surface.

It is another object of the invention to produce polarized output from a folded path laser with a Brewster window having only one critical surface.

It is still another object of the invention to produce a laser beam from a folded path gaseous discharge laser with a higher optical efficiency and power than accomplished in the prior art.

It is still a further object of the invention to produce a polarized laser output from a folded path gaseous discharge laser, with a higher optical efficiency and power than that accomplished in the prior art, employing a Brewster window having only one critical surface.

SUMMARY OF THE INVENTION

A laser is disclosed with a single critical surface Brewster window. A Littrow prism is mounted by its first planar face to a laser cavity having a principal optical axis along which is propagated the laser beam. This first planar face is oriented at Brewster's angle with respect to the principal optical axis for admitting a refracted, plane polarized component of the incident beam. The Littrow prism has a second substantially planar face which may have an inferior optical finish. This second face intersects the first face along the line perpendicular to the principal axis at an angle with respect to the first face such that the second face is substantially perpendicular to the refracted component of the laser beam. A planar mirror is mounted by means of a layer of refractive index matching optical cement, to the second face of the Littrow prism and normal to the direction of propagation of the refracted plane polarized component. This component is reflected back upon itself and out of the first planar face of the prism along the principal axis of the laser cavity. Laser action may thus be sustained, generating a polarized laser beam with a Brewster window having only one critical surface.

A modified embodiment of the invention is disclosed wherein the laser cavity is folded upon itself, with the first face of the Littrow prism intersecting the principal optical axes of both legs of the folded path. Attached to the second face of the Littrow prism is a 45–90° triangular prism whose hypotenuse is mounted by means of a layer of refractive index matching optical cement, so as to be normal to the direction of propagation of the refracted plane polarized component of the laser beam entering the first face of the Littrow prism. This component is reflected into the second leg of the folded path whereby laser action is sustained generating a polarized laser beam, with a Brewster window having only one critical surface.

A third embodiment of the invention is disclosed as an improved folded path gaseous discharge laser having a maximized optical efficiency and a maximized optical power output. The gaseous discharge paths for the first and second legs of the folded path are bifurcated such that the gaseous discharge current density can be independently controlled for each leg. This permits the selective reduction of the cross sectional area of that leg containing the planar end mirror with respect to that leg containing the spherical end mirror while maintaining an equal current density in each leg, thereby maximizing both the optical efficiency and the output power of the laser.

DESCRIPTION OF THE DRAWINGS

The foregoing and other objects, features and advantages of the invention will be apparent from the following more particular description of the preferred embodiments of the invention, as illustrated in the accompanying drawings.

FIG. 4 depicts the Littrow prism Brewster window employed in an improved folded axis gaseous discharge laser.

Figure 1:
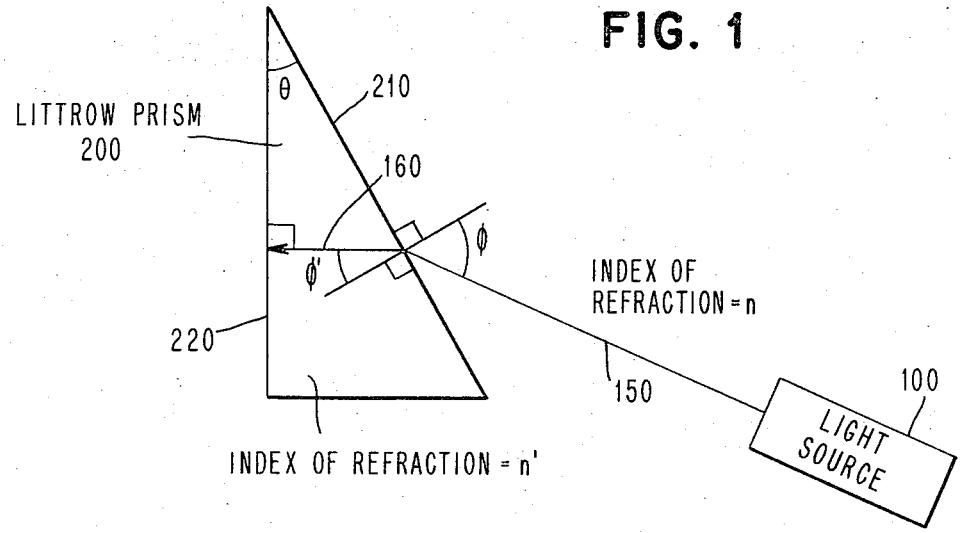
FIG. 1 depicts the geometric relationship between the incident beam propagating along the principal axis of the laser and the Littrow prism.

DISCUSSION OF THE PREFERRED EMBODIMENT:

FIG. 1 discloses the geometric arrangement of the incident laser beam 150 from the laser 100 onto the Littrow prism 200. The incident laser beam 150 is incident upon the entry face 210 of the Littrow prism 200 at the angle $\phi$. In order for the refracted component 160 of the incident laser beam to be totally plane polarized, the angle $\phi$ must be equal to Brewster's angle $\phi_b$ such that the tangent of $\phi_b$ equals the ratio of the index of refraction $n'$ of the Littrow prism to the index of refraction $n$ of the ambient. By Snell's Law the angle of refraction $\phi'$ is related to the angle of incidence $\phi$ by the relation $n \sin \phi = n' \sin \phi'$. The Littrow prism is characterized by the apex angle $\theta$. The normal face 220 of the Littrow prism must, by definition, be perpendicular to the refracted component 160. A geometric analysis shows that $\phi'$ equals $90° - (90-\theta) = \theta$. Thus combining Snell's Law and Brewster' s Law, sine $\theta$ equals cosine $\phi_b$. A typical value of $\theta$ for borosilicate crown glass having an index of refraction of 1.50 is $\theta = 33.7°$ and Brewster's angle $\phi_b = 56.3°$. The normal face 220 of the Littrow prism 200 must be normal to the refracted, plane polarized component 160. Thus, if the normal face 220 were reflective, the refracted, plane polarized beam 160 would be reflected back upon itself and exit from the Littrow prism 200 through the entry face 210 at the exact point of incidence of the initial laser beam 150.

It is seen that the entry face 210 of the Littrow prism 200 must have the high quality "laser polish" in order to reduce the amount of surface scattering. The invention disclosed herein is based in part upon a recognition that the normal face 220 need not have the high quality optical surface finish "laser polish" if it is coated with an optical cement whose index of refraction matches that of the Littrow prism and which in turn bonds a reflecting element such as a planar mirror or a reflecting prism, mounted perpendicular to the refracted component 160. This basic structural concept is employed in the embodiments disclosed below.

Figure 2:
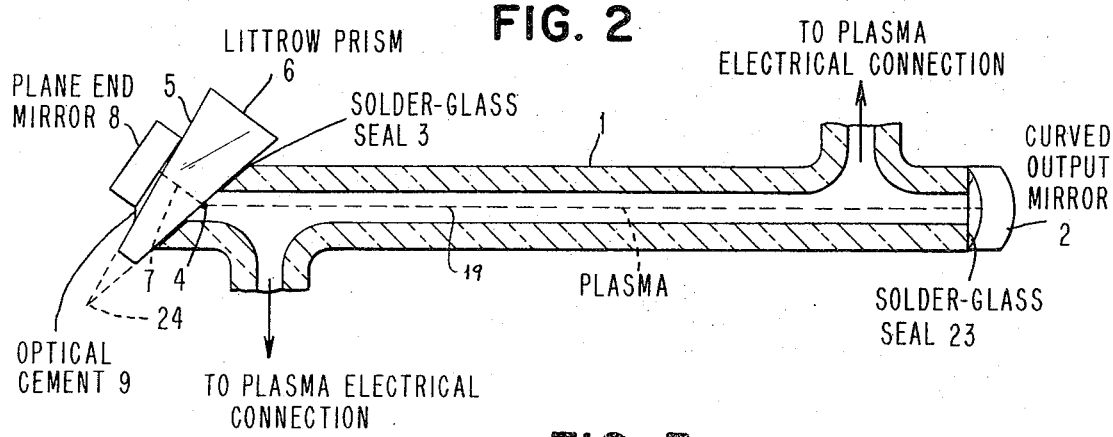
FIG. 2 depicts the Littrow prism Brewster window as employed in a single axis gaseous discharge laser.

FIG. 2 depicts the assembled laser cavity having one Brewster angle surface. The cavity is assembled by first attaching the cathode and anode to tube 1 by appropriate glass blowing and then attaching the output mirror 2 and the Littrow prism 6 to the tube 1 using solder glass 23 and 3 respectively. The tolerance on the alignment of the concave/spherical end mirror 2 is to maintain its center of curvature on the tube axis by plus or minus one-fourth of the tube diameter. The tolerance on the alignment of the Littrow prism 6 is plus or minus one-half a degree from Brewster's angle. These tolerances are large and can be maintained during the reflow of the solder glass 3 and 23. The tube 1 is then baked at a high temperature, much higher than would be possible if epoxy seals were used, for example. It is then processed and filled with the proper gas, such as helium, neon mixture, and then removed from the fill station and placed in its operating environment. The gas discharge is operated normally and the plane end mirror 8 is attached to the back side 5 of the Littrow prism 6 by the refractive index matching optical cement 9. The plane end mirror 8 is aligned until optimum laser output is achieved and is held in place until the cement 9 sets. The laser is now optimally aligned with integral mirrors and has a polarized output.

The Littrow prism 6 is the additional optical element that assures a polarized output. It has only two critical tolerances: (1) the surface 4 exposed to the plasma must be polished to give a low scatter and (2) the bulk material of the prism 6 must have a low light scattering characteristic. The optical quality of the back surface 5 is not especially important because the refractive index matching cement 9 which is used to attach the end mirror 8, fills the interstices on the surface 5. The apex angle 24 of the prism 6 need be no more precise than approximately plus or minus one-half degree because the final alignment of the system is done by positioning the end mirror 8, the optical cement 9 making the appropriate correcting wedge. Consequently, the tolerances on the Littrow prism 6 are less stringent than those for a conventional Brewster angle window and therefore the prism will be less expensive to manufacture, in comparable quantities, than a single Brewster angle window having two "laser polished" surfaces.

Figure 3:
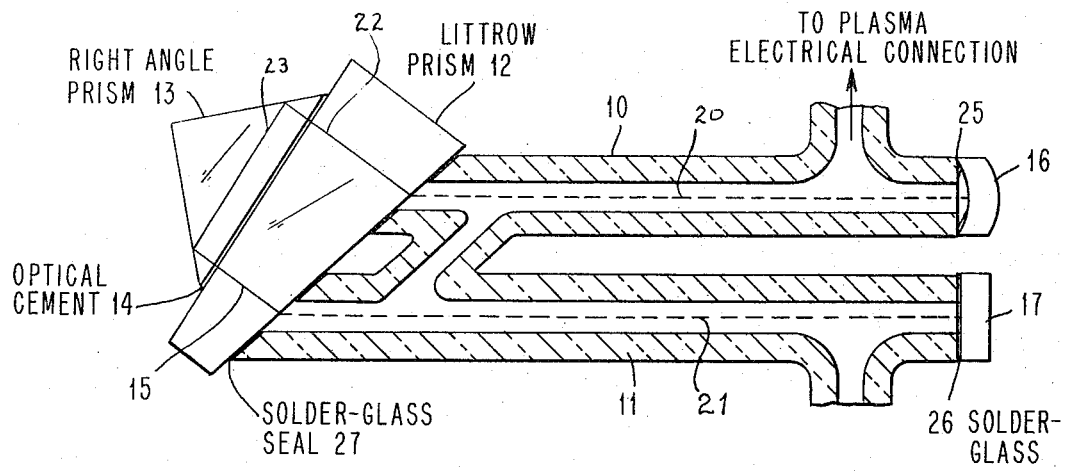
FIG. 3 depicts the Littrow prism Brewster window as employed in a folded axis gaseous discharge laser.

FIG. 3 depicts the use of the Littrow prism 12 in a conjunction with a 45°-90° triangular prism 13 to fold the plasma tube 10, 11 onto a folded axis laser. The concave spherical mirror 16 has a center of curvature which is focused upon the reflecting surface of the planar mirror 17, along the path of the upper leg 10, the Littrow prism 12, the right angle prism 13 back through the Littrow prism 12, and the lower leg 11. The mirrors 16 and 17 and the Littrow prism 12 are connected with solder glass 25, 26 and 27 respectively, as described above. The final alignment is done by positioning the right angle prism 13 while the plasma tube 10, 11 is operating and then using the refractive index matching optical cement 14 to hold the prism in this position.

The advantages of this procedure are that an integral mirror laser is inexpensively manufactured to generate polarized output. The laser gas is in contact only with glass not with organic cement. The optimum alignment is done under normal operating conditions thereby allowing maximization of the power output. The Littrow prism is relatively inexpensive, in comparable quantities, with respect to a conventional two surface Brewster window. The laser tube can be a folded axis system giving a rugged assembly, and the Littrow prism will discriminate against unwanted spectral lines.

FIG. 4 discloses an improved folded path gaseous discharge laser having a maximized optical efficiency and maximized optical power output employing a single, critical surface Brewster window for producing a polarized laser beam. Shown is a coaxial structure with a biaxial optical cavity that is suitable for low cost automated manufacturing. The structure is assembled from four glass tubes, 30 and 32 which are two capillary tubes adjacent to one another within a coaxial mounting tube 34, which is mounted coaxially within the reservoir tube 36. The electrical discharge follows two isolated, parallel electrical paths from A to C and from B to C. From C the discharge travels between the outside walls of the capillary tube 30 and 32 and the inside wall of the coaxial mounting tube 34, to a discharge port 38 in the coaxial mounting tube 34 at D. This port 38 is centered in the length of the hollow cathode 40.

The assembly consists of a cylindrically symmetrical structure of a form well suited for automated assembly as is used in electron tube manufacture. The concave/spherical output mirror 44 has its center of curvature focused upon the reflecting surface of the plane mirror 46 along the path of the upper capillary tube 30, the Littrow prism 48, the half reflecting prism 54, the half reflecting prism 56, and the lower capillary tube 32. The mirrors 44 and 46 and the Littrow prism 48 are mounted with solder glass 50 and 52 so that there are no organic materials exposed to the gaseous discharge. Final alignment is made by cementing the two right angle prisms 54, 56 in place with index matching cement 60 and positioning them to give optimum laser output.

The problems solved in this design are: (1) Simple construction of a folded path helium neon laser suitable for 10 to 20 milliwatts of polarized output. (2) The structure is sufficiently rigid so that optical cavities of 80 centemeters or more can be assembled with integral mirrors. (3) The two capillary bore diameters 30 and 32 can be chosen to optimize mode selection. For example, in FIG. 4 the capillary tube BC would be smaller than the capillary tube AC. (4) The two parallel current paths can be operated at different current values to give optimum gain for both bores. And finally, (5) The Attachment of the mirrors 44 and 46 is an operation that has relatively large tolerances so that a solder glass seal 50 can be used, while the critical alignment of the prisms 54 and 56 is carried out after the tube is in its normal operating condition.

The folded path gaseous discharge laser of FIG. 4 has a maximized optical efficiency because the cross sectional diameter of the bore of the respective capillary tubes are reduced to the approximate diameter of the active lasing region of the gaseous discharge therein. The device has a maximized optical power output because the anode 41 can be driven at a higher gaseous discharge current than the anode 42, because the gaseous discharge paths may be independently operated. The capillary tube 30 constitutes a first discharge path, the region C constitutes a third discharge path, the region between the mounting tube 34 and the capillary tube 30 and 32 constitutes a fourth discharge path, and the region between the mounting tube 34 and the reservoir tube 36 constitutes a fifth discharge path, the series array of which constitutes a discharge path from the anode 41 in the capillary tube 30 to the cathode 40 in the reservoir tube 36. Similarly, the capillary tube 32 constitutes a second discharge path which forms a series array with the third, fourth and fifth discharge paths to constitute a discharge path connecting the anode 42 in the capillary tube 32 to the cathode 40 in reservoir tube 36. To optimize the efficiency of the folded laser system, the cross sectional dimension of capillary tube 32 is reduced to more closely conform to the narrow, conical shape of the active lasing region of the gaseous discharge contained therein. Because of the reduced diameter in capillary tube 32, the current density in the gaseous discharge therein will be higher than the current density in the gaseous discharge within the capillary tube 30, given that the same current is driven through the anode 41 as is driven through the anode 42. Since the power output of a gaseous discharge laser has a maximum value for some value of gaseous discharge current density, the power output of a folded path gaseous discharge laser is maximized by equalizing the gaseous discharge current density in both legs of the system. Therefore the current driven by the anode 41 must be larger than the current driven by the anode 42 so that the current density in the larger diameter capillary tube 30 will be more closely equal to the current density in the capillary tube 32. In the folded path laser system disclosed in FIG. 4, this independent control of the current densities in the upper and lower capillary tubes can be made. Thus, both the optimum efficiency and the optimum power output of the folded path device can be attained. These features, in combination with the single, critical surface Brewster window provided by the Littrow prism 48, yields a high performance very rugged, easily fabricatable gaseous discharge laser having a polarized output.

The structures in FIGS. 1, 2, 3 and 4 can be related as follows. The surfaces 210 and 220 of the Littrow prism 200 are perpendicular to the plane of FIG. 1, and intersect along the line perpendicular to the plane of FIG. 1. The paths of light beams 150 and 160 are parallel to the plane of FIG. 1. The surfaces 4 and 5 of the Littrow prism 6 are perpendicular to the plane of FIG. 2, and correspond respectively to the surfaces 210 and 220 for the Littrow prism of FIG. 1. Surfaces 4 and 5 intersect along a line perpendicular to the plane of FIG. 2. The apex angle 24 for the Littrow prism of FIG. 2 corresponds to the angle $\theta$ in FIG. 1. The light beam 19 along the principal axis for the plasma tube 1 and the refracted beam 7 lie in the plane of FIG. 2 and correspond respectively to the beams 150 and 160 of FIG. 1. The Littrow prism 12 of FIG. 3 is oriented with respect to the plasma tube 10 and the plane of FIG. 3 in the same manner as the Littrow prism 6 of FIG. 2 is oriented with respect to the plasma tube 1 and the plane of FIG. 2. The light beam 20 along the principal optical axis for tube 10 and the light beam 21 along the principal optical axis for tube 11 are mutually parallel and lie in the plane of FIG. 3. Light beam 20, upon passing into Littrow prism 12 becomes the refracted component 22 which corresponds to the refracted beam 7 in the Littrow prism 6 of FIG. 2. The refracted light beam 22 in Littrow prism 12 is totally internally reflected as light beam 23 in prism 13. Light beam 23 is totally internally reflected in prism 13 as light beam 15 which passes into the Littrow prism 12. Light beam 15 then passes out of Littrow prism 12 and is refracted along the principal optical axis for tube 11 as the light beam 21. The Littrow prism 48 of FIG. 4 is oriented with respect to the capillary tube 30 and the plane of FIG. 4 in the same manner as the Littrow prism 6 of FIG. 2 is oriented with respect to the plasma tube 1 and the plane of FIG. 2. The light beam 24 along the principal axis for tube 30 and the light beam 33 along the principal axis for tube 32, are mutually parallel and lie in the plane of FIG. 4. Light beams 24, 28, 29, 31 and 33 of FIG. 4 correspond respectfully to light beams 20, 22, 23, 15 and 21 of FIG. 3.

While the invention has been particularly shown and described with reference to the preferred embodiments thereof, it will be understood by those skilled in the art that the foregoing and other changes in form and details may be made therein without departing from the spirit and scope of the invention.

I claim:

1. A laser with a single critical surface Brewster window, comprising:

a laser cavity having a principal optical axis along which is propagated the laser beam;

a Littrow prism having a first planar face located on said principal optical axis, oriented at Brewster's angle with respect thereto, and mounted as a window in contact with said laser cavity, for admitting a refracted, plane polarized component of said laser beam incident along said principal axis;

said Littrow prism having a second substantially planar face which intersects said first face along a line perpendicular to said principal axis, at an angle with respect to said first face such that said second face is substantially perpendicular to said refracted component of said laser beam;

a reflecting means in contact with said second face and normal to the direction of propagation of said refracted, plane polarized component for reflecting said component back upon itself and out of said first planar face of said prism along said principal axis;

whereby laser action is sustained generating a polarized laser beam, with a Brewster window having only one critical surface.

2. The laser with a single critical surface Brewster window of claim 1, where said reflecting means comprises:

a planar mirror mounted on said second face of said Littrow prism, and perpendicular to the direction of propagation of said refracted, plane polarized component;

said planar mirror mounted by means of a layer of optical cement having an index of refraction matching that of said Littrow prism.

3. The laser with a single critical surface Brewster window of claim 1, wherein said reflecting means comprises:

a 45°–90° triangular prism, mounted with its hypotenuse on said second face of said Littrow prism, and perpendicular to the direction of propagation of said refracted, plane polarized component;

said 45°–90° triangular prism mounted by means of a layer of optical cement having an index of refraction matching that of said Littrow prism;

and wherein said laser cavity comprises:

a folded tube having paralled optical axes spaced so that light transmitted from a first segment of said tube, is totally internally reflected in said 45°–90° prism so as to be transmitted through a second portion of said Littrow prism, exiting from the Littrow prism at a point coincident with the axis of propagation of light in said second segment of said laser tube.

4. A folded path gaseous discharge laser having a maximized optical efficiency and a maximized optical power output, comprising:

a first cylindrical lasing cavity tube with a first anode therein, for supporting laser action in a discharge excited gas along a first gaseous discharge path contained therein;

a second cylindrical lasing cavity tube parallel to and juxtaposed side-by-side with said first tube, with a second anode therein for supporting laser action in a discharge excited gas along a second gaseous discharge path contained therein;

a cylindrical mounting tube encompassing and sealed to said first and second lasing cavity tube with its axis parallel to the axes of said first and second lasing cavity tubes, and forming a fourth gaseous discharge path in the region bounded by said mounting tube and said first and second lasing cavity tube;

means mounted on a first end of said mounting tube and spaced from the proximate first end of said first and said second lasing cavity tube, for reflecting laser light generated along the axis of said first lasing cavity tube so as to enter said second lasing cavity tube along its axis and for reflecting laser light generated along the axis of said second lasing cavity tube so as to enter said first lasing cavity tube along its axis;

the region separating said reflecting means from said first end of said first and second lasing cavity tubes and encompassed by said mounting tube, forming a third gaseous discharge conduction path;

a flat mirror mounted on a second end of said second lasing cavity tube, opposite the end where is located said reflecting means;

a spherical mirror mounted on a second end of said first lasing cavity tube, opposite the end where is located said reflecting means;

said spherical mirror having a center curvature focused upon the surface of said flat mirror, along a path connecting said spherical mirror to said reflecting means and connecting said reflecting means to said flat mirror;

said second lasing cavity tube having a diameter less than the diameter of said first lasing cavity tube so as to minimize the volume of gaseous discharge not contributing to laser action in said second lasing cavity tube, to maximize the optical efficiency thereof;

a cylindrical reservoir tube encompassing and sealed to said cyclindrical mounting tube, with a cathode therein, for serving as a reservoir for the gaseous discharge and forming a fifth gaseous discharge path;

said mounting tube having a discharge port communicating between the reservoir tube containing said fifth gaseous discharge path and the mounting tube containing said fourth gaseous discharge path;

the series array of said first, third, fourth and fifth gaseous discharge paths conducting a higher gaseous discharge current from said first anode than the gaseous discharge current from said second anode connected through the series array of said second, third, fourth and fifth gaseous discharge paths, such that the gaseous discharge current density in said first lasing cavity tube is substantially equal to the gaseous discharge current density in said second lasing cavity tube, maximizing the optical power output of the system.

5. The folded path gaseous discharge laser of claim 4, wherein the reflecting means further comprises:

a Littrow prism having a first planar face located on the axes of said first and second cylindrical lasing cavity tube and oriented at Brewster's angle with respect thereto, for admitting a refracted, plane polarized component of the laser beam formed by said first cyclindrical lasing cavity;

said Littrow prism having a second substantially planar face which intersects said first face along a line perpendicular to the plane formed by the axes of said first and second cylindrical lasing cavity tubes at an angle with respect to said first face such that said second face is substantially perpendicular to said refracted component of said laser beam;

a 45°–90° triangular prism mounted with its hypotenuse of said second face of said Littrow prism, and perpendicular to the direction of propagation of said refracted, plane polarized component, and disposed to transmit from said first cyclindrical lasing cavity tube, the laser beam generated therein, which is totally internally reflected in said 45°–90° prism so as to be transmitted through a second portion of said Littrow prism, exiting from the Littrow prism at a point coincident with the axis of said second cylindrical lasing cavity tube;

said 45°–90° prism mounted by means of a layer of optical cement having an index of refraction matching that of said Littrow prism.

* * * * *